Aug. 19, 1947.  E. B. FITZGERALD  2,426,006
HYDRAULIC CONTROL FOR ELECTRIC MOTORS
Filed Oct. 17, 1944
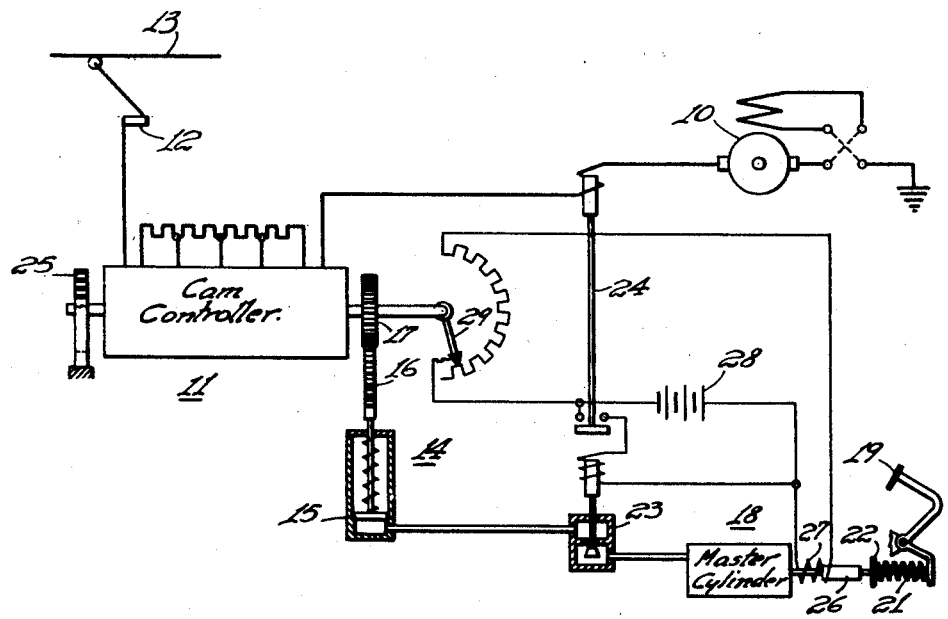
WITNESSES:
INVENTOR
Edward B. Fitzgerald.
BY
ATTORNEY

UNITED STATES PATENT OFFICE 2,426,006

HYDRAULIC CONTROL FOR ELECTRIC MOTORS

Edward B. Fitzgerald, Pittsburgh, Pa., assignor to Westinghouse Electric Corporation, East Pittsburgh, Pa., a corporation of Pennsylvania Application October 17, 1944, Serial No. 559,075

5 Claims. (Cl. 172—179)

My invention relates, generally, to control systems and, more particularly, to systems for controlling the operation of electrically propelled vehicles, such as trolley coaches and the like.

The control equipments of existing trolley coaches have a power pedal at the operator's position in each coach which is connected to an electric controller at the rear of the coach by means of rods, bell cranks, etc. The brake pedal at the operator's position is also connected to the controller with another set of rods for controlling the electric braking. Such a system of control rods is a source of equipment failures because of the high pedal pressures, excessive friction, etc. and involves considerable maintenance expense.

An object of my invention, generally stated, is to provide a control system which shall be simple and efficient in operation and which may be economically manufactured and installed.

A more specific object of my invention is to reduce the maintenance expense on electric control equipment.

Another object of my invention is to reduce the effort required of the operator of an electrically propelled vehicle to operate the control equipment.

Still another object of my invention is to provide in a motor control system for electrically propelled vehicles and the like for utilizing a fluid pressure system and for arresting the advancing movement of the controller whenever the motor current exceeds a predetermined amount.

A still further object of my invention is to provide in a motor control system wherein the motor controller is actuated through a fluid pressure system by a pedal actuated master cylinder for increasing the force or pressure applied to the master cylinder in accordance with the advancement or operating position of the controller.

Other objects of my invention will be explained fully hereinafter and will be apparent to those skilled in the art.

In accordance with one embodiment of my invention, the operation of the propelling motor of a vehicle is controlled by a cam-operated switch group which is actuated by a hydraulic slave cylinder, the operation of which is remotely controlled by a pedal-operated master cylinder. A magnet valve is disposed in the hydraulic line between the slave cylinder and the master cylinder and is controlled by a limit relay responsive to the motor current. A booster is provided at the master cylinder to compensate for the increase in the force required to operate the cam group as the cam controller is advanced against the force of a spring for returning the controller to the "off" position.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises a motor 10 which may be of a type suitable for propelling an electric vehicle (not shown), a controller 11 which is preferably of the cam-type suitable for controlling the operation of the motor 10 in the usual manner, a current collector 12 for engaging a trolley conductor 13, a hydraulic slave cylinder 14 having a piston 15 disposed therein for actuating the controller 11 through a rack 16 and pinion 17, a master cylinder 18 for remotely controlling the operation of the slave cylinder 14 and a manually operable pedal 19 which is depressed by the operator of the vehicle to build up a fluid pressure in the master cylinder 18 and the slave cylinder 14.

When the pedal 19 is depressed, a spring 21 is compressed thereby actuating a piston rod 22 to build up a fluid pressure in the hydraulic system. However, the flow of the hydraulic fluid is controlled by a magnet valve 23 disposed in the hydraulic line between the master cylinder 18 and the slave cylinder 14. The operation of the magnet valve 23 is controlled by a current limit relay 24, the actuating coil of which is connected in the motor circuit and is, therefore, responsive to the motor current.

Inasmuch as the cam controller 11 is provided with a spiral spring 25 for returning the controller to the "off" position, the force required to operate the controller increases as the controller is advanced and the spring load becomes greater. In order to decrease the effort required of the operator of the vehicle to operate the control equipment, a compensating booster is provided to offset the increased force of the spring 25 as the controller 11 advances. As shown, the compensating booster comprises a solenoid 26 which is disposed to increase the pressure on the master cylinder 18 when its coil 27 is energized by a battery 28. The energization of the coil 27 is controlled by a variable rheostat 29, the arm of which is driven by the shaft of the controller 11. Thus the current in the solenoid coil 27 is increased as the controller 11 is advanced, thereby providing the additional energy necessary to offset the opposing force of the spring 25 on the controller.

With this system, the spring loading of the master cylinder 18 under the control of the foot pedal 19 may be utilized to obtain slow speed running notches on the controller 11 for operating the vehicle in heavy traffic. However, when the foot pedal 19 is pushed to the floor to compress fully the spring 21 this will supply sufficient energy to cause the master cylinder 18 to advance the controller to a point where the solenoid coil 27 is sufficiently energized to exert additional pressure on the master cylinder. As the controller is advanced, the resistance in series with the solenoid coil 27 is decreased by movement of the rheostat arm 29, thereby providing a graduated increase in the force applied to the master cylinder to compensate for the increased spring load on the controller 11.

If at any time during the acceleration of the vehicle the motor current increases above the setting of the current limit relay 24, the contact members of this relay are closed, thereby energizing the actuating coil of the magnet valve 23. The energization of its actuating coil causes the valve 23 to close, thereby stopping the flow of fluid in the hydraulic system.

In this manner, the controller 11 is stopped and held in its advanced position until the counter-electromotive force of the motor 10 decreases the motor current below the setting of the current limit relay 24, thereby permitting the valve 23 to open. In this manner, the advancement of the controller 11 is automatically controlled by the current limit relay 24 independently of the position to which the operator's foot pedal 19 is depressed.

From the foregoing description it is apparent that I have provided a control system which will appreciably decrease the work required on the part of the operator of an electric vehicle to operate the control equipment. Furthermore, the control equipment is simplified by eliminating previously utilized mechanical devices, such as rods, levers, bell cranks, etc., thereby decreasing the maintenance expense. The present system affords both manual and automatic control of the acceleration of the vehicle, thereby making it suitable for operation under all conditions of traffic.

Since numerous changes may be made in the above-described construction and different embodiments of the invention may be made without departing from the spirit and scope thereof, it is intended that all matter contained in the foregoing description or shown in the accompanying drawing should be interpreted as illustrative and not in a limiting sense.

I claim as my invention:

1. In a control system, in combination, a motor, a controller for controlling the operation of the motor, fluid-pressure means for actuating the controller, manually operable means for developing pressure in the fluid-pressure means, valve means for controlling the operation of the fluid-pressure means, relay means responsive to the motor current for controlling the operation of said valve means, and electrical means for varying the pressure in the fluid-pressure means according to the position of the controller.

2. In a control system, in combination, a motor, a controller for controlling the operation of the motor, fluid-pressure means for actuating the controller, manually operable means for developing pressure in the fluid-pressure means, and electrical means responsive to the advancement of the controller for increasing the pressure applied to the fluid-pressure means.

3. In a control system, in combination, a motor, a controller for controlling the operation of the motor, fluid-pressure means for actuating the controller, manually operable means for applying pressure to the fluid pressure means, electrically actuated means for increasing the pressure applied to the fluid-pressure means, and means responsive to the advancement of the controller for controlling the energization of the electrically actuated means.

4. In a control system, in combination, a motor, a controller for controlling the operation of the motor, fluid-pressure means for actuating the controller, manually operable means for applying pressure to the fluid pressure means, electrically actuated means for increasing the pressure applied to the fluid-pressure means, means responsive to the advancement of the controller for controlling the energization of the electrically actuated means, and means responsive to the motor current for controlling the operation of the fluid-pressure means.

5. In a control system, in combination, a motor, a controller for controlling the operation of the motor, fluid-pressure means for actuating the controller, manually operable means for applying pressure to the fluid pressure means, electrically actuated means for increasing the pressure applied to the fluid-pressure means, means responsive to the advancement of the controller for controlling the energization of the electrically actuated means, and means responsive to the motor current for stopping further advancement of the controller by the fluid-pressure means and holding the controller in its advanced position.

EDWARD B. FITZGERALD.

REFERENCES CITED

The following references are of record in the file of this patent:

UNITED STATES PATENTS

| Number | Name | Date |
|---|---|---|
| 789,754 | Napier | May 16, 1905 |
| 795,024 | Case | July 18, 1905 |
| 2,165,119 | Wunsche | July 4, 1939 |
| 1,352,483 | Smith | Sept. 14, 1920 |
| 1,387,503 | Mardis | Aug. 16, 1921 |
| 1,871,777 | Clarke | Aug. 16, 1932 |